US007366298B2

(12) United States Patent
Pedersen et al.

(10) Patent No.: US 7,366,298 B2
(45) Date of Patent: Apr. 29, 2008

(54) HEADSET

(75) Inventors: Charles L. Pedersen, Virum (DK); Martin Bech, Frederikssund (DK); Tom Bogeskov-Jensen, Slangerup (DK); Karsten Langhorn, Bronshoj (DK)

(73) Assignee: GN Netcom A/S, Ballerup (DK)

( * ) Notice: Subject to any disclaimer, the term of this patent is extended or adjusted under 35 U.S.C. 154(b) by 225 days.

(21) Appl. No.: 10/533,674

(22) PCT Filed: Nov. 10, 2003

(86) PCT No.: PCT/DK03/00772

§ 371 (c)(1), (2), (4) Date: Aug. 8, 2005

(87) PCT Pub. No.: WO2004/045243

PCT Pub. Date: May 27, 2004

(65) Prior Publication Data

US 2006/0098812 A1 May 11, 2006

(30) Foreign Application Priority Data

Nov. 11, 2002 (DK) ............................... 2002 01731

(51) Int. Cl.
*H04M 1/00* (2006.01)
*H04M 9/00* (2006.01)
*H04R 25/00* (2006.01)

(52) U.S. Cl. .................... 379/430; 455/575.2; 381/376

(58) Field of Classification Search ................ 379/430, 379/431, 428.01, 428.02; 381/370, 374–376, 381/381; 455/575.2
See application file for complete search history.

(56) References Cited

U.S. PATENT DOCUMENTS

| | | | | |
|---|---|---|---|---|
| 6,359,995 | B1 | 3/2002 | Ou | |
| 7,110,535 | B2 * | 9/2006 | Bodley et al. | 379/430 |
| 2002/0021800 | A1 | 2/2002 | Bodley et al. | |

FOREIGN PATENT DOCUMENTS

| | | |
|---|---|---|
| JP | 2002-009908 | 1/2002 |
| WO | WO 01/86923 A1 | 11/2001 |

* cited by examiner

*Primary Examiner*—Curtis Kuntz
*Assistant Examiner*—Tuan D Nguyen
(74) *Attorney, Agent, or Firm*—Altera Law Group, LLC

(57) ABSTRACT

A headset (1, 10, 30) e.g. for use in connection with wireless communication by means of Bluetooth technology in connection with mobile telephones, PSTN telephones and the like, which comprises a housing (2, 3, 11, 28) with a transducer (5, 12, 27) in the form of a speaker, as well as a microphone (4, 14, 29) and an ear hook (6, 23, 28). In a first embodiment, the housing may be constructed as two shells (2, 3) which may be opened and closed so that all mechanical parts may be concealed on the housing when the headset (1, 10, 30) is not in use, thereby ensuring that the various parts are not damaged when the headset is stored in a pocket. The shells (2, 3) may be interconnected by means of a hinge (7, 8) which has an axis disposed in the same plane as the surface of the shells. Alternatively, the shells may be arranged such that the axis is disposed in a perpendicular plane relative to the surface of the shells. In a second embodiment, the housing (11, 28) is formed by a closed housing from which the ear hook (23, 31) and/or the microphone 13, 26) may be moved in or out. The invention provides a headset (1, 10, 30) which is extremely easy to use, and where all mechanical and electrical parts are well protected when the headset is not used. Furthermore, all embodiments may be provided with a lock which may be mechanical and/or electrical, which ensures that only the right user can use the headset.

14 Claims, 3 Drawing Sheets

HEADSET

Figure 2:
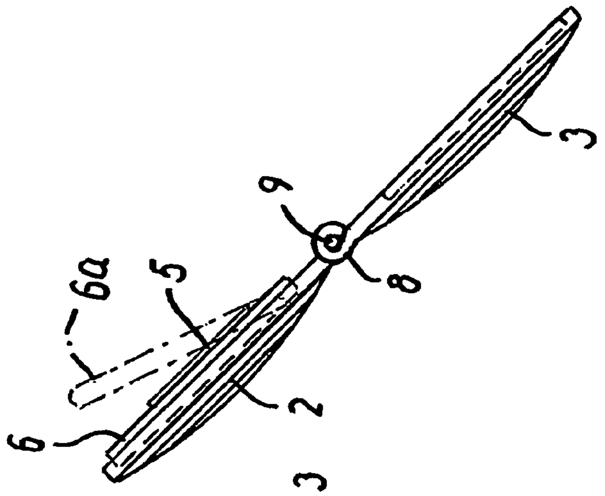

The invention relates to a headset comprising a transducer, a microphone and an ear hook for suspending the headset from a user's ear.

Such a headset is known from WO 01/86923.

This known headset is constructed as a compact unit, where a transducer in the form of a speaker is arranged in a housing, which additionally has hinge parts, where an ear hook and a microphone arm, respectively, are secured via hinge links. When the headset is to be used, the ear hook and the microphone arm are pivoted out from the housing, and the headset is then ready for use, as it can now be suspended from the left or right ear of a user. The headset is very compact and also configured to provide wireless communications links, e.g. using Bluetooth technology in connection with mobile telephones, PSTN telephones and the like.

As mentioned, it is a very compact headset which has a low weight and is therefore very user-friendly, in particular when used for an extended period of time, as it does not cause trouble or inconvenience to a user's ear. Further, in a state of non-use it may easily be stored in e.g. a pocket. However, storing the headset in a pocket involves a certain risk, as it may be damaged, since ear hook and microphone arm are freely exposed to the housing, whereby these parts may be subjected to inexpedient, mechanical loads.

Accordingly, an object of the invention is to provide a headset which has all the mentioned advantages of WO 01/86923, but which is less liable to be mechanically damaged.

The object of the invention is achieved by a headset of the type stated in the introductory portion of claim 1, which is characterized in that the transducer, the microphone and the ear hook are encapsulated in a housing or are integral parts of a housing. In this way, the headset appears as a closed capsule in a state of non-use, in which all movable parts are protected.

When, as stated in claim 2, the housing is formed by two shells which are interconnected by a hinge, it is ensured that the shells are always connected with each other so that the one shell, which is e.g. to serve as a cover part, is not lost.

Expediently, as stated in claim 3, the two shells are connected along their outer edge with the hinge by a shaft which, is disposed in the same plane as the surface of the shells. This results in a structure which also imparts mechanical advantages, since the various parts to be arranged between the shells do not necessarily have to be disposed in their respective shells when they are interconnected, but may utilize the space between the shells, so that e.g. some of the internal parts of the headset may be stored in a compartment formed by both shells. Also, the entire headset may be constructed as a very flat structure.

In an alternative embodiment, as stated in claim 4, the hinge has a shaft which is perpendicular to the surface of the shells, as the headset may hereby be brought into a state of use merely by rotating the one shell in the same plane relative to the other shell. For some users, this may facilitate handling of the headset when opening and closing it.

Expediently, as stated in claim 5, the transducer and the ear hook are arranged in the one shell, while the microphone is arranged in the other shell, thereby providing an optimum positioning of the transducer at the ear and the microphone as close to the mouth as possible.

In a second embodiment, as stated in claim 6, the housing is formed by a closed housing, which has two recesses from which the ear hook and the microphone arm, respectively, may be moved into or out of the housing. The number of movable parts is limited additionally hereby, since now just movement of ear hook and microphone arm is to take place.

This second embodiment is additionally easy-to-use, if, as stated in claim 7, at least one release button is arranged on the outer side of the housing for activating the movement of the ear hook and/or the microphone arm into or out of the housing. This release function may moreover be arranged in an advantageous manner if, as stated in claim 8, the release button activates the ear hook and/or the microphone arm by means of a spring load, or, as stated in claim 9, if the microphone arm may be screwed into or out of the housing.

Additional alternative embodiments of the headset of the invention are that the microphone arm is telescopic, as stated in claim 10, or is articulated, as stated in claim 11.

Finally, in all embodiments, the headset may be configured such that the housing is provided with a lock for locking the hook, the microphone arm and the transducer inside the housing, as stated in claim 12, thereby reducing the risk of theft, as theft is not attractive since the headset cannot be used without breaking the lock.

If, additionally, the lock is provided with an electrical code activating the electrical parts of the headset, as stated in claim 13, the use of the headset by other persons than the owner is prevented.

Figure 3:
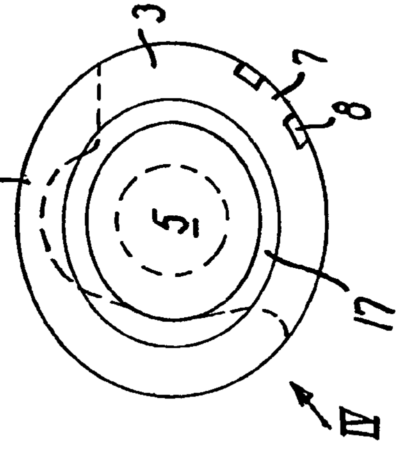
Figure 4:
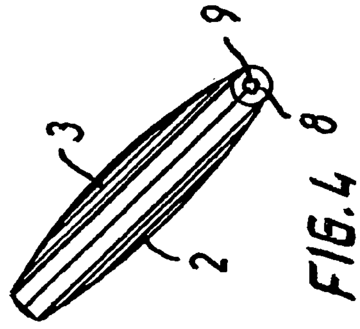
Figure 1:
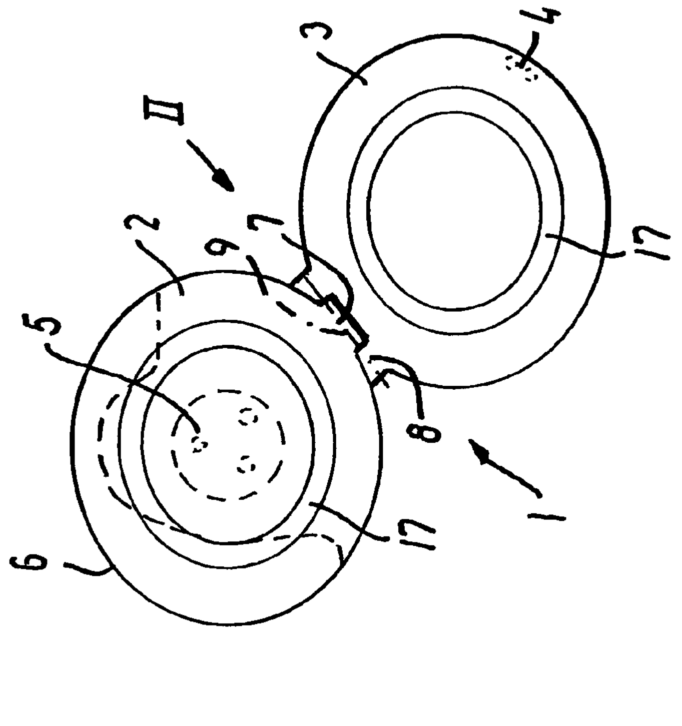
Figure 9:
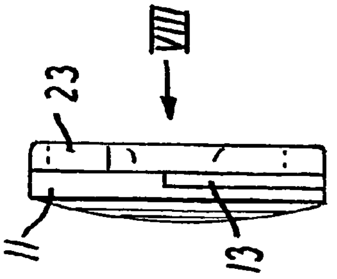
Figure 6:
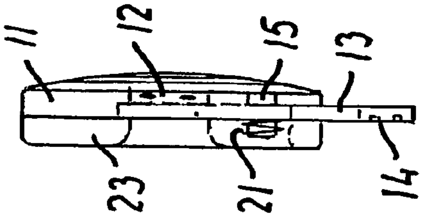
Figure 5:
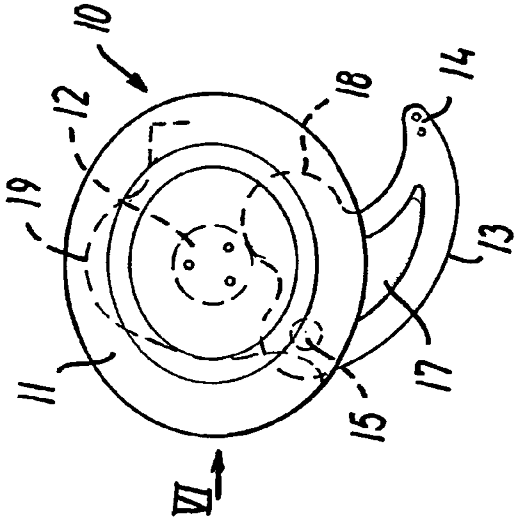
Figure 7:
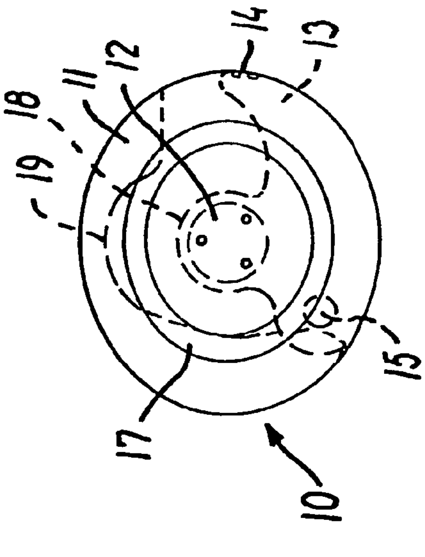
Figure 8:
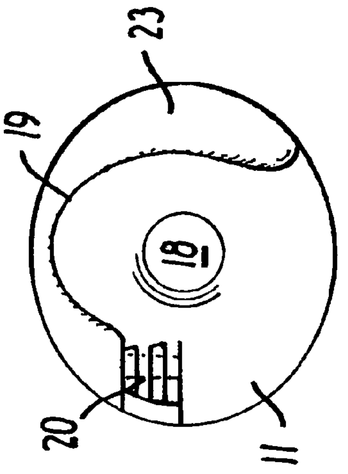
Figure 12:
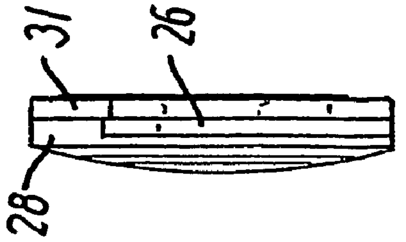
Figure 11:
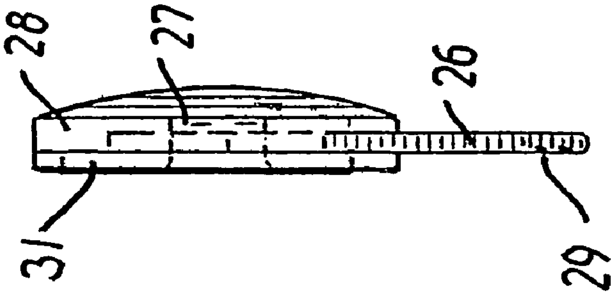
Figure 10:
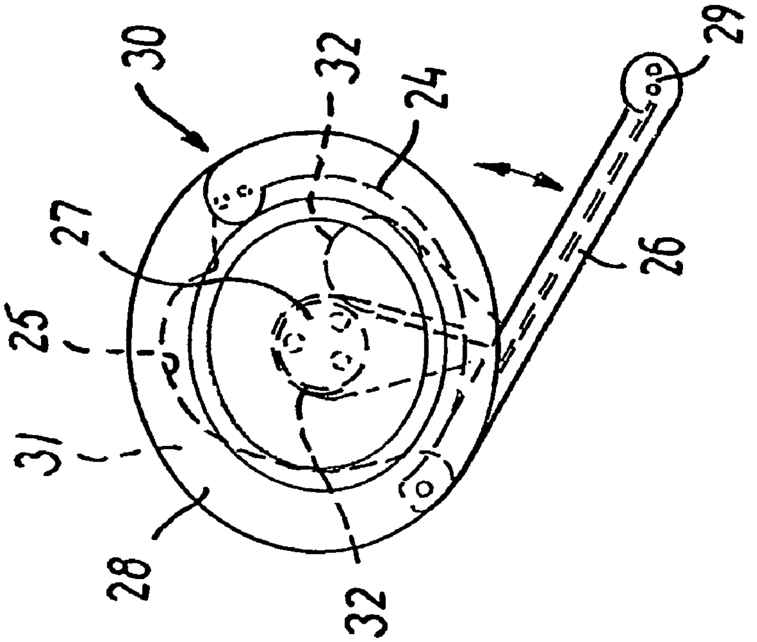

The invention will now be explained more fully with reference to the embodiments shown in the drawing, in which FIG. 1 shows a headset in a first embodiment of the invention, FIG. 2 shows the headset of FIG. 1 seen in the direction of the arrow I in FIG. 1, FIG. 3 shows the headset of FIG. 1 and FIG. 2 in a folded-together state, FIG. 4 shows the headset of FIG. 3 seen in the direction of the arrow IV in FIG. 3, FIG. 5 shows a headset in an open state according to the invention in a second embodiment, FIG. 6 shows the headset of FIG. 5 seen in the direction of the arrow VI in FIG. 5, FIG. 7 shows the headset of FIG. 5 and FIG. 6 in a closed state with inserted microphone arm, FIG. 8 shows the headset of FIG. 9 seen in the direction of the arrow VIII in FIG. 9, seen closed from behind, FIG. 9 shows the headset of FIG. 6 with inserted microphone arm, FIG. 10 shows the headset in an open state in a third embodiment, FIG. 11 shows the headset of FIG. 10, seen from the side, and FIG. 12 shows the headset of FIG. 10, seen from the side in a closed state.

In FIG. 1, a headset in a first embodiment of the invention is generally designated 1. As will appear from this figure and FIGS. 2-4, the headset consists of two shells which are designated 2 and 3. The two shells are hinged to each other by hinge parts 7, 8 which are provided on each shell, and which may e.g. be formed such that a shaft 9 connects the hinge parts with each other. As will be seen, the shaft 9 is disposed in the same plane as the surface of the shells, which means that the shells may be closed by rotation about the shaft 9, as is also shown in FIG. 4. An ear hook 6 is arranged inside or between the shells 2, 3, and, as indicated in FIG. 2, this ear hook may assume two positions, viz. a first position in which it is disposed in a recess in the one shell 2, shown at 6, while it is rotated partly out of the shell 2 in the second position, shown at 6*a* in FIG. 2. Further, each of the shells is constructed such that a transducer in the form of a speaker 5 is additionally arranged in the shell 2, while a microphone 4 is arranged in the shell 3. Finally, FIGS. 1 and 2 show areas 17, which illustrate that these areas may be designed with another colour than the rest of the headset or be coated with metal, perhaps embossed with a logo.

The headset is used as follows:

When it is to be used, the shells are separated from the position shown in FIG. 3 and FIG. 4 to the position shown in FIGS. 1 and 2, and then the ear hook is rotated out from the shell 2 and is suspended from a user's one ear. The other shell, which contains the microphone 4, will be positioned along the user's cheek with the microphone as close to the user's mouth as necessary. The embodiment shown in FIGS. 1-4 thus provides a compact headset where all sensitive parts are well protected in a state of non-use, thereby eliminating damage e.g. during transport in a user's pocket.

Although the embodiment in FIGS. 1-4 shows that the hinge parts are formed such that the shells for opening or closing are to be rotated into or out of their planes, nothing prevents the hinge parts from being formed with a shaft which is perpendicular to the surface of the shells. In such a situation, opening and closing may be performed by displacing the shells relative to each other so that a rotation takes place in their parallel planes.

FIGS. 5 to 9 show a second embodiment of a headset according to the invention. In these figures, a headset according to the invention is generally designated 10 and has a disc-shaped housing 11, which is formed with a recess through which a microphone arm 13 with a microphone 14, which is suspended from a shaft 15 arranged inside the housing, may be rotated into or out of the housing 11. The rotation of the microphone arm 13 may be established by a spring force impact from a spring 21 arranged on the shaft. This impact may be applied through a locking mechanism, e.g. in the form of a push-button which when activated will cause the spring 21 to force the microphone arm out of the housing 11 through the recess. When the microphone arm is to be returned into the housing, it is affected by a force acting opposite the spring, and it is retained in the housing by means of the locking mechanism until the locking mechanism is activated again via the push-button.

As will be seen, the housing accommodates a speaker 12 which may be protected by a tongue 18, which is provided on the microphone arm, and which will cover and protect the speaker 12 when the microphone arm is moved inwards through the recess.

An ear hook 23 is arranged on the underside of the housing 11 in a recess whose contours are indicated at 19, and this ear hook may be released from the housing 11 and be suspended from a user's ear by means of a hinge 20.

Finally, it is indicated at 17 that, for reasons of design, the microphone arm may be given a different colour in this area.

The headset of FIGS. 5-9 is unique in that all electrical and mechanical parts are well protected when the headset is not in use.

FIGS. 10-12 show a headset which is generally designated 30. As will be seen, this headset consists of a disc-shaped housing 28 which centrally carries a speaker 27. Two recesses are provided along the edge of the housing, of which the first recess serves to store a flexible microphone arm 26 with a microphone 29, it being possible to bend the microphone arm into the one recess which extends elliptically, as shown. Moreover, the microphone arm is formed with a tongue 32 which closes and opens, respectively, the speaker area 27 when the microphone arm is moved from the open to the closed state, and vice versa. In addition, a recess 25 is provided on the opposite side of the housing 28, which is adapted to receive a rotatable ear hook 31. This ear hook 31 may be constructed in the same manner as is explained in connection with the embodiment which is shown in FIGS. 7-9.

The headset of FIGS. 10-12 is used in the following manner:

When it is to be used, the microphone arm and the ear hook are released from their positions in the closed headset, so that the speaker is exposed and the ear hook may be arranged on a user's ear, whereby the microphone arm assumes an operating position along the user's cheek.

In a variant of the headset shown in FIGS. 10-12, the microphone arm may be constructed such that it is moved into and out of the housing in a channel provided along the outer side of the housing.

Finally, it is noted that the microphone arm itself may be telescopic or articulated in structure if further space saving is needed in the housing when the headset is in a state of non-use.

The invention claimed is:

1. A headset comprising a transducer, a microphone and an ear hook for suspending the headset from a user's ear, a housing, wherein the housing is formed by two opposing spaced apart shells, which are interconnected by a hinge, such that the housing can assume a closed state of non-use and an open state of use, wherein the transducer, the microphone and the ear hook are encapsulated in the housing in the closed state.

2. A headset according to claim 1, wherein the housing is formed by substantially coplanar two shells which are interconnected by a hinge and wherein said microphone is fully encapsulated between said shells when in a stored position.

3. A headset according to claim 2, wherein the two shells are connected along their outer edge with the hinge by a shaft which is disposed in the same plane as the surface of the shells.

4. A headset according to claim 2, wherein the hinge has a shaft which is perpendicular to the surface of the shells.

5. A headset according to claim 2, wherein the transducer and the ear hook are arranged in the one shell, while the microphone is arranged in the other shell.

6. A headset according to claim 1, wherein the microphone is mounted on a microphone arm, characterized in that the housing is formed by a closed housing, which has two recesses from which the ear hook and the microphone arm, respectively, may be moved into or out of the housing.

7. A headset according to claim 6, wherein at least one release button is arranged on the outer side of the housing for activating the movement of the ear hook and/or the microphone into or out of the housing.

8. A headset according to claim 7, wherein the release button activates the ear hook and/or the microphone arm by means of a spring load.

9. A headset according to claim 6, wherein the microphone arm may be screwed into or out of the housing.

10. A headset according to claim 6, wherein the microphone arm is telescopic.

11. A headset according to claim 6, wherein the microphone arm is articulated.

12. A headset according to claim 1, wherein the housing is provided with a lock for locking the ear hook, the microphone and the transducer inside the housing.

13. A headset according to claim 12, wherein the lock is provided with an electrical code for activating the electrical parts of the headset.

14. A headset comprising a transducer, a microphone and an ear hook for suspending the headset from a user's ear, a housing, wherein the housing is formed by two opposing spaced apart shells forming a channel therebetween, which are interconnected by a hinge, such that the housing can assume a closed state of non-use and an open state of use, wherein the transducer, the microphone and the ear hook are encapsulated in the housing in the closed state; the microphone pivotally extending from said shells and flexibly articulatable from a space fully within said channel to at least partly outside said channel.

* * * * *